United States Patent
Lee et al.

(10) Patent No.: US 12,473,613 B2
(45) Date of Patent: *Nov. 18, 2025

(54) RARE EARTH EXTRACTION APPARATUS AND METHOD OF USE THEREOF

(71) Applicants: W. Davis Lee, Rockport, ME (US); Mark R. Amato, South Hamilton, MA (US)

(72) Inventors: W. Davis Lee, Rockport, ME (US); Mark R. Amato, South Hamilton, MA (US)

( * ) Notice: Subject to any disclaimer, the term of this patent is extended or adjusted under 35 U.S.C. 154(b) by 525 days.

This patent is subject to a terminal disclaimer.

(21) Appl. No.: 17/736,930

(22) Filed: May 4, 2022

(65) Prior Publication Data
US 2022/0259699 A1    Aug. 18, 2022

Related U.S. Application Data

(63) Continuation-in-part of application No. 16/523,974, filed on Jul. 26, 2019, now Pat. No. 11,643,706.

(51) Int. Cl.
*C22B 59/00* (2006.01)
*C22B 5/12* (2006.01)

(52) U.S. Cl.
CPC ........... *C22B 59/00* (2013.01); *C22B 5/12* (2013.01)

(58) Field of Classification Search
None
See application file for complete search history.

(56) References Cited

FOREIGN PATENT DOCUMENTS

DE    102014201223 A1 * 7/2015 ............. C22B 4/005

OTHER PUBLICATIONS

De 102014201223A1—English translation—from Google Patents (Year: 2014).*
McPheeters et.al., ("Experiments on Cold Trap Regeneration by NaH Decomposition", Argonne National Laboratory, 1979 (Year: 1979).*
Badr ("Smelting of Iron Oxides Using Hydrogen Based Plasmas", Ph. D. thesis, Montanuniversitat Leoben, 2007 (Year: 2007).*
Lewis et.al., ("5-small polymeric containers", Forensic Polymer Engineering, 2010 (Year: 2010).*
Vac Aero International, Inc., 2017 (Year: 2017).*
Miller ("Tips and Tricks for the Lab: Air-Sensitive Techniques (1)", Chemistry Views, May 7, 2013. pp. 1-16 (Year: 2013).*
Sabat et al. ("Hydrogen Plasma Processing of Iron Ore", Metallurgical and Materials Transactions B, vol. 48, pp. 1561-1594, 2017 (Year: 2017).*
Wolfram Research Mathematica's ElementData [periodictable.com, "Density of the Elements", data provided by Mathematica's ElementData function from Wolfram Research, Nov. 29, 2012; (Year: 2012).*

* cited by examiner

*Primary Examiner* — Yun Qian
(74) *Attorney, Agent, or Firm* — Kevin H. Hazen; Hazen Patent Group, LLC

(57) ABSTRACT

The invention comprises an apparatus and method of use thereof for generating a rare earth from a rare earth oxide, comprising the steps of: (1) dissociating the rare earth oxide and hydrogen gas in a reaction chamber by inductively heating the reaction chamber to greater than 2000° K to form the associated rare earth and water vapor in a reaction process; (2) driving the reaction process forward by removing the water vapor from the reaction chamber by condensing and freezing the water vapor on a first cold trap surface as water ice, where the reaction comprises: $RE_2O_3 + 3H_2 \rightarrow 2RE + 3H_2O$, where REO is a rare earth oxide and RE comprises a rare earth in the rare earth oxide; and/or (3) monitoring the reaction process by monitoring generation of at least one of the rare earth and the water in a control system designed for continuous/semi-continuous operation.

9 Claims, 7 Drawing Sheets

RARE EARTH EXTRACTION APPARATUS AND METHOD OF USE THEREOF

CROSS-REFERENCES TO RELATED APPLICATIONS

This application is a continuation-in-part of U.S. patent application Ser. No. 16/523,974 filed Jul. 26, 2019,
all of which is incorporated herein in its entirety by this reference thereto.

BACKGROUND OF THE INVENTION

Field of the Invention

The invention relates generally to a generation of an elemental form of a rare earth from a rare earth oxide.

Discussion of the Prior Art

Patents related to the current invention are summarized here.

P. Marston, et. al., "Magneto-plasma Separator and Method for Separation", U.S. Pat. No. 9,121,082 (Sep. 1, 2015) describe a plasma separator and mass filter system operable on a rare earth oxide.

Problem

There exists in the art a need for a more efficient process for generating rare earths from rare earth oxides.

SUMMARY OF THE INVENTION

The invention comprises a rare earth purification apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises an apparatus and method of use thereof for generating a rare earth from a rare earth oxide, comprising the steps of: (1) dissociating the rare earth oxide and hydrogen gas in a reaction chamber by inductively heating the reaction chamber to greater than 2000° K to form the associated rare earth and water vapor in a reaction process; (2) driving the reaction process forward by removing the water vapor from the reaction chamber by condensing and freezing the water vapor on a first cold trap surface as water ice, where the reaction comprises: $RE_2O_3 + 3H_2 \rightarrow 2RE + 3H_2O$, where REO is a rare earth oxide and RE comprises a rare earth in the rare earth oxide; and/or (3) monitoring the reaction process by monitoring generation of at least one of the rare earth and the water in a control system designed for continuous/semi-continuous operation.

Herein, a rare earth element, also referred to as a rare earth, refers to one or more of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). They are often found in minerals with Thorium (Th) and less commonly Uranium (U).

Herein, a rare earth ore contains: (1) one or more rare earth elements in any oxidized form in a naturally occurring ore material, such as a solid material, rock, and/or sediment. The ore is optionally and preferably crushed and/or powdered prior to the extraction process described herein. Herein, an ore is a natural occurrence of rock or sediment that contains sufficient minerals with economically important elements, typically metals, that can be economically extracted from the deposit. Herein, a processed ore is an ore that has been prepared for extraction, such as by mechanical filtering, crushing, physical separation, and/or via a pre-chemical treatment.

Rare Earth Extraction System

Figure 1:
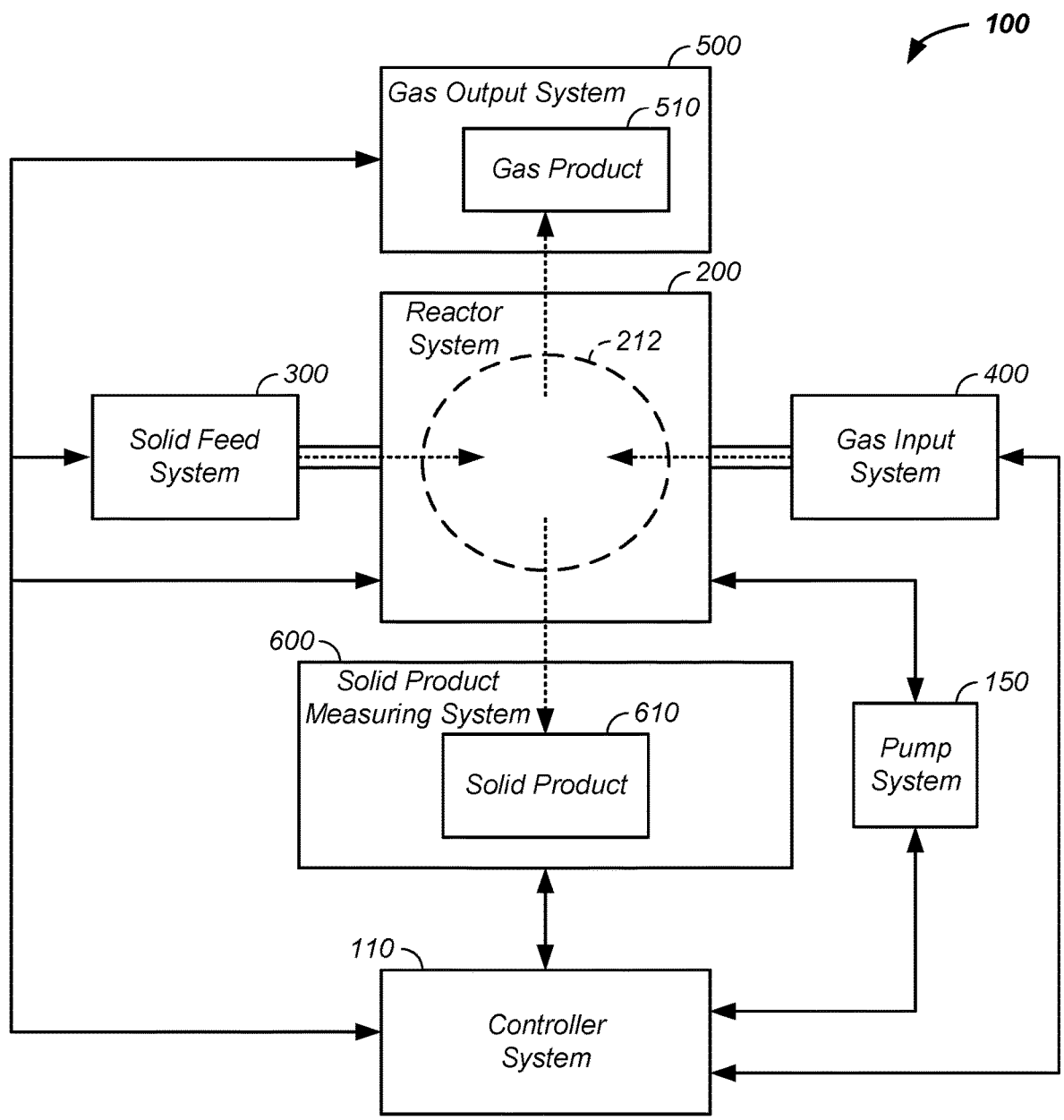
FIG. 1 illustrates a rare earth purification system.

Referring now to FIG. 1, a rare earth extraction system 100 is described, which is also referred to herein as a rare earth purification system. Generally, the rare earth extraction system 100 uses a reactor system 200 containing a reaction chamber 212, such as a high temperature chamber and/or a plasma chamber, to break down a rare earth oxide in the presence of hydrogen to form an elemental form of the rare earth and water, which is referred to herein as a main reaction and is further described infra.

Still referring to FIG. 1, generally, a solid feed system 300 delivers a rare earth oxide and/or a rare earth oxide ore to the reactor system 200 and a gas input system 400 delivers hydrogen, optionally and preferably with a carrier gas, to the reaction chamber 212. The generated gas product 510 and/or water is output through a gas output system 500, which is optionally used to measure progress of the rare earth purification. The solid product 610 is output left behind in the reactor system 200 and/or is measured using a solid product measuring system 600. A controller system 110 is used to: (a) control temperature of the reaction chamber through control of current and voltage of the induction coils/windings; (2) pressure of the reaction chamber; (3) control feed rate and/or feed timing of the solid feed system 300; (4) control gas flow rate, gas flow timing, and/or gas composition of the gas input system 400; (5) monitor a gas output system related to progress of the main reaction in the reaction chamber 212; (6) monitor a solid product measuring system 600 related to progress of the main reaction in the reaction chamber 212; and/or (7) control a pump system 150, such as a vacuum system of the rare earth extraction system 100. Components of the rare earth extraction system 100 are further described infra.

Figure 2A:
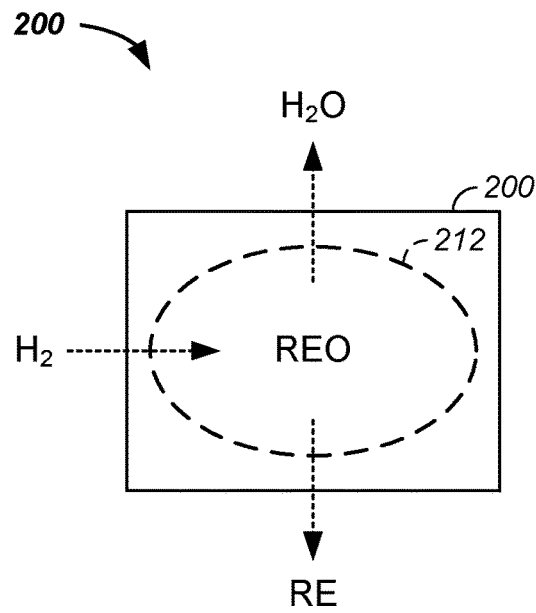
FIG. 2A, FIG. 2B, and FIG. 2C, respectively, illustrate a rare earth extraction, a neodymium extraction, and a reaction chamber.

Referring now to FIG. 2A, a main reaction of the reactor system 200 is further described. The main reaction contains at its core a reduction of a metal oxide, such as with hydrogen or any reducing agent/environment, to form a metal, such as in equation 1.

$$\text{Metal oxide} + \text{hydrogen} \rightarrow \text{metal} + \text{water} \qquad \text{eq. (1)}$$

For example, a rare earth oxide, REO, reacts with hydrogen gas, $H_2$, to form a rare earth, RE, and water, such as in equation 2.

$$REO + H_2 \rightarrow RE + \text{water} \qquad \text{eq. (2)}$$

Typically, rare earth oxides have rare earths in the +3 state, so a typical reaction is as in equation 3,

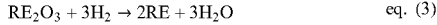
$$RE_2O_3 + 3H_2 \rightarrow 2RE + 3H_2O \qquad \text{eq. (3)}$$

where "RE" refers to a rare earth and/or a rare earth element, such as cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y) or as in equation 4,

$$REO + H_2 \rightarrow RE + H_2O \qquad \text{eq. (4)}$$

where "REO" refers to a rare earth oxide, rare earth oxide ore, rare earth ore, and/or any rock/ore like structure, such as a powder where the purity of the REO is typically that found in a natural rare earth containing rock. The REO ore optionally contains one or more rare earth elements in any chemical form.

Figure 2B:
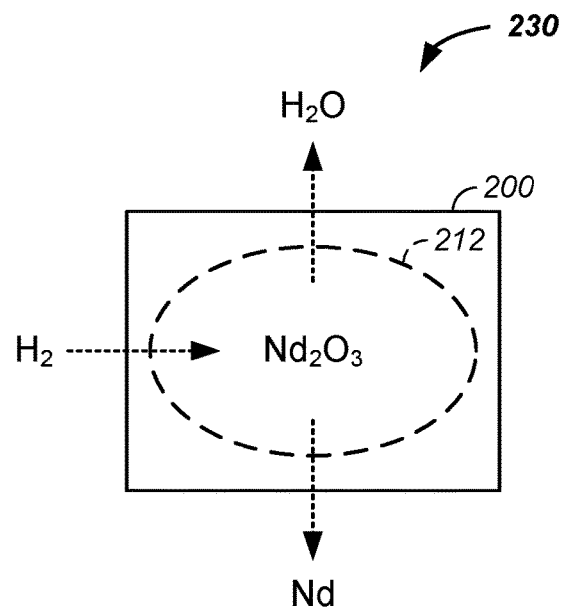

Referring now to FIG. 2B, a representative example of the main reaction is provided for a particular rare earth oxide, neodymium oxide, $Nd_2O_3$ forming neodymium, Nd, such as in equation 5, where neodymium is representative of any rare earth.

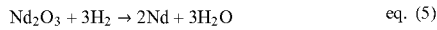
$$Nd_2O_3 + 3H_2 \rightarrow 2Nd + 3H_2O \qquad \text{eq. (5)}$$

In practice, a rare earth oxide has a first lower price and the corresponding rare earth of the rare earth oxide has a second higher price with the difference being a differential price. The rare earth extraction system 100 described herein extracts the rare earth from the rare earth oxide with an operating expense of less than the differential price, which results in a cost effective system for generation of rare earth material in an elemental form.

Reactor System

Figure 2C:
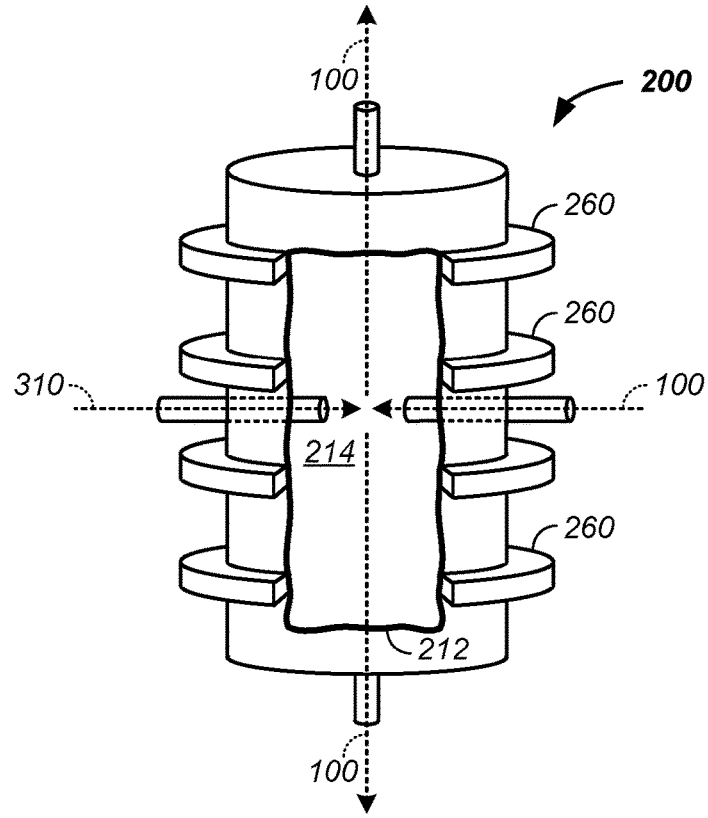

Referring to FIG. 2C, the reaction chamber 212 of the reactor system 200 is optionally and preferably used to contain a plasma, where the plasma is heated by an inductive coil 260, such as a set of inductive coils connected to a power supply. One or more components of the reactor system 200 are optionally and preferably controlled by the controller system 110.

Still referring to FIG. 2C, optionally and preferably the solid feed system 300 feeds a solid, such as a rare earth oxide and/or a rare earth oxide ore into the reaction chamber 212, such as via a solid input line 310. Similarly, optionally and preferably the gas input system 400 feeds a gas, such as a mixture of hydrogen gas and a carrier gas, into the reaction chamber 212, such as via an gas input line 410. The carrier gas is optionally and preferably inert, such as a noble gas, and is used to dilute the hydrogen gas to a non-explosive concentration. A preferred carrier gas is argon. The controller system 110 controls the mixture of the reducing gas and the inert gas via in the gas input system 400.

Controller System

Still referring to FIG. 2C, optionally and preferably, the controller system 110 maintains a knowledge of mass of the material in the reaction chamber 212. For example, the controller system: (1) is provided a purity of a starting rare earth oxide solid and/or (2) retains a history of a total mass of the rare earth oxide inserted/injected into the reaction chamber. Coupled with a reaction progress measurement, such as a measure of mass of the water product and/or a mass of the solid product, and chemical mass balance equations, the controller system 110 optionally and preferably alters the amount of hydrogen in the gas input system to maintain the hydrogen gas concentration at less than 4% as hydrogen gas explodes from 4 to 76% at temperatures and pressures in the reaction chamber 212. Hence, the controller system 110 optionally and preferably maintains the argon concentration at at least 96% through knowledge of input reagents, mass balance, total hydrogen input, and at least one metric of product mass, such as a mass of a rare earth and/or a mass of produced water. Optionally, a hydrogen sensor, a residual gas analyzer, a mass spectrometer, and/or a spectrometer using photons in the range of 375 to 900 nm is/are used to measure a concentration of a transition product and or final product, which is provided to the controller system 110, where chemically related and mathematically related reagent concentrations are determined by the controller system 110 and used to adjust input of the hydrogen concentration to the reaction system 212. The controller system 110, timing of the hydrogen injection to the reaction chamber 212 optionally and preferably controls timing of insertion of the rare earth oxide insertion into the reaction chamber 212, and/or controls an amount of the rate earth oxide insertion into the reaction chamber 212.

Referring again to FIG. 1, the controller system 110 also controls a pump system 150 to maintain desired pressure as a function of time in the reaction chamber 212 and/or temperature of the reaction chamber 212 via control of current flow through the inductor lines 260.

Solid Feed System

Figure 3:
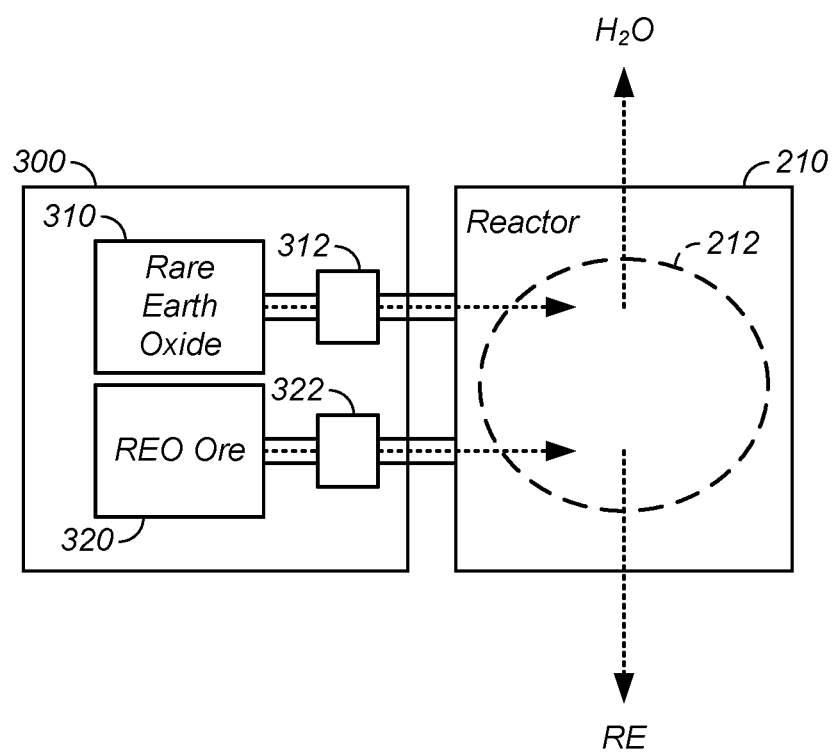
FIG. 3 illustrates loading the reaction chamber with a form or a rare earth oxide.

Referring now to FIG. 3, the solid feed system 300 is further described. Generally, the controller system 110 controls timing and amount of delivery of rare earth oxides to the reaction chamber 212. The rare earth oxides are in the form of: (1) a rare earth oxide powder 310 and/or (2) a rare earth oxide ore 320. Before and/or after using the pump system 150 to reduce pressure about the rare earth oxide, the rare earth oxide is delivered to the reaction chamber: in batches and/or by using a conveyor system/conveyor belt through an airlock along a first deliver path 312 and/or along a second delivery path 322. More generally, two or more staging areas are optionally used where as the rare earth oxide is delivered along the first path 312 the second staging area is being prepared with more material and/or is being reduced in pressure to a suitable delivery pressure to the reaction chamber 212. Then, while material in the second staging area is being delivered to the reaction chamber along the second path, the first staging area is being similarly prepared with additional material and/or is being reduced in pressure to less than 100, 50, or 20 torr. The cycle repeats n times where n is a positive integer greater than 1, 2, 5, 10, 50, or 100.

EXAMPLE I

Figures 4A, 4B:
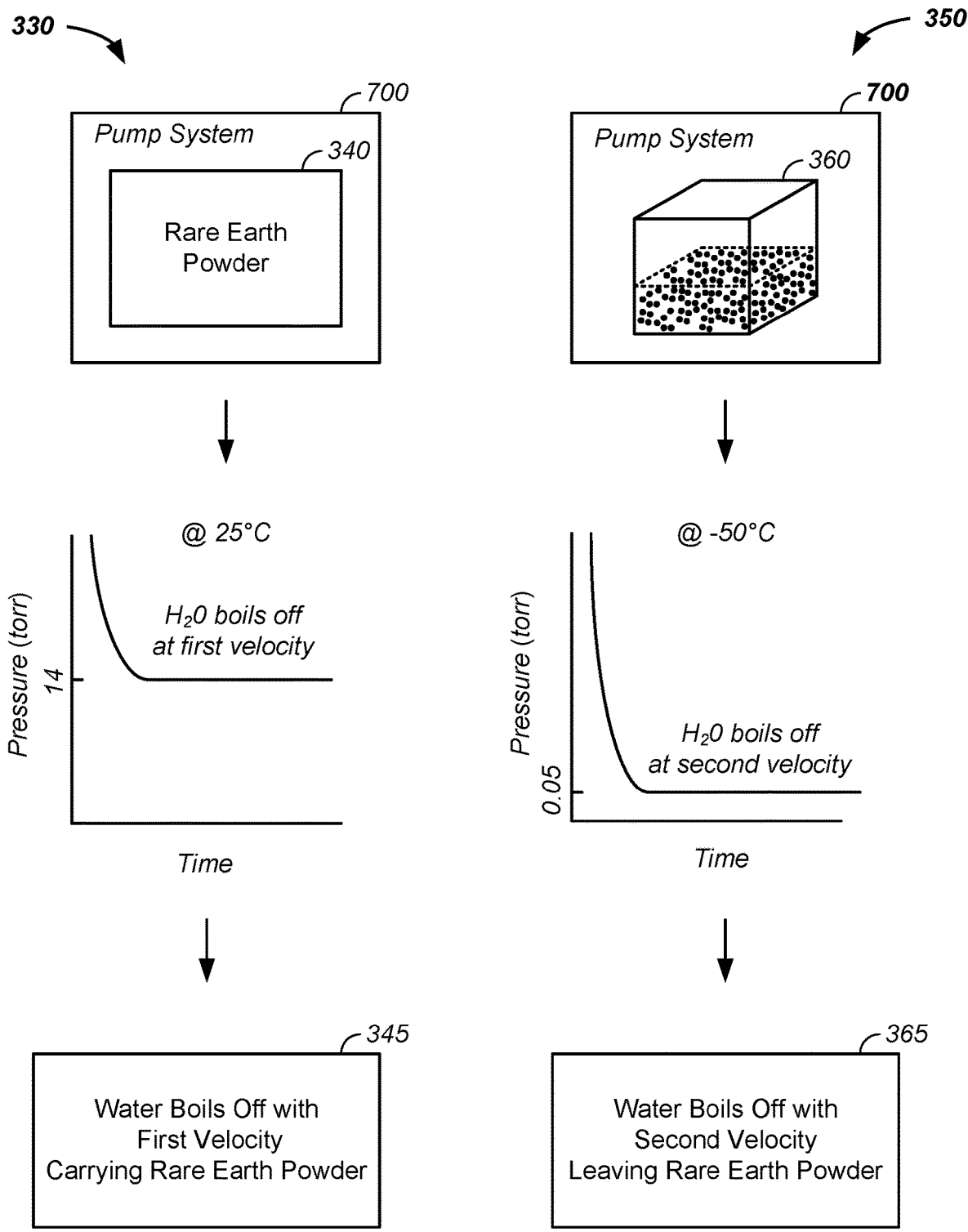
FIG. 4A and FIG. 4B illustrate water boiling off of a rare earth at room temperature and at −50° C. using a reduction in pressure, respectively.

Referring now to FIG. 4A and FIG. 4B an example of an optional preparation system of the rare earth oxide in the reaction chamber is described. Referring now to FIG. 4A, a first rare earth oxide delivery process 330 is described. In the first delivery process 330, a rare earth oxide powder 340 is pumped down using the pump system 150 under control of the controller system 110. As the pump system reduces the pressure, water impurity in the rare earth oxide powder boils off. As illustrated at an exemplary standard temperature of 25° C., water boils off at 14±1 torr. When the water boils off at 14 torr, the water has a first velocity that is great enough to carry off the valuable rare earth powder 345 when in very small particulate form, such as described infra. Referring now to FIG. 4B, the first rare earth oxide delivery process 330 is modified to yield a second rare earth oxide delivery process 350 where the water boils off at a second velocity that is sufficiently low as to not remove the rare earth oxide from the reaction chamber 212. More particularly, in an initial process, the rare earth oxide is frozen 360, such as in a crucible or any suitable holding container. In a second process, the frozen rare earth oxide containing frozen water impurity is placed into the reaction chamber 212, such as by inversion of the crucible. As illustrated, the frozen rare earth oxide is at an exemplary temperature of −50° C. In a third process, the controller system 110, using the pump system 150, reduces the pressure in the reaction chamber, such as from standard pressure of 760 torr to a plasma friendly pressure, such as less than one torr. As the rare earth oxide is at −50° C. in this example, the water does not boil off until 0.05±0.01 torr. As the water boils off at a lower pressure, the water has the second velocity that does not disturb the remaining rare earth oxide powder 340. Hence, the rare earth oxide powder remains in the reaction chamber 212 for subsequent conversion to a rare earth using the rare earth extraction system 100. Generally, the velocity of the water molecules boiling off decreases with temperature, such as from 25, 20, 10, 0, −10, −20, −30, −40, or −50° C.

Gas Input System

Figure 5:
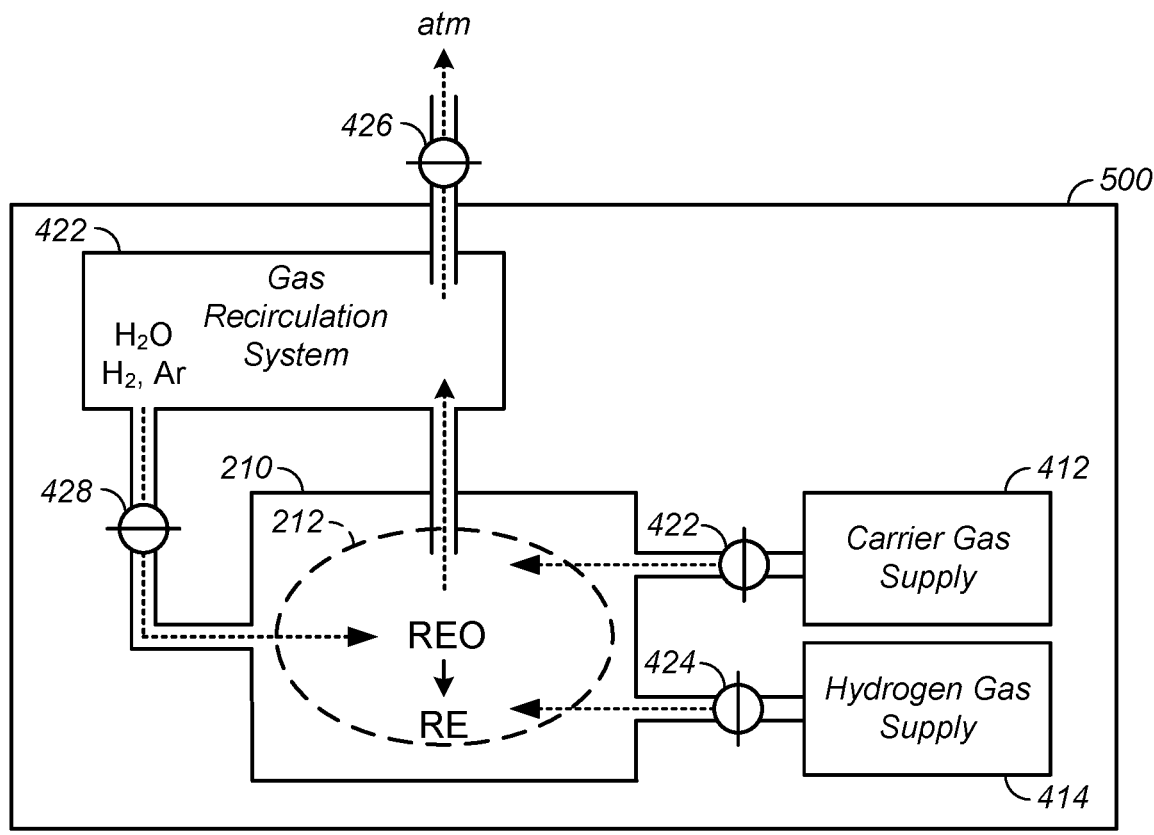
FIG. 5 illustrates a gas recirculation system.

Referring now to FIG. 5, the gas input system 400 is further described. As described, supra, the controller system 110 controls the gas input system 400 to maintain the reducing agent concentration in the reaction chamber 212 at an appropriate concentration. Herein, without loss of generality and for clarity of presentation, hydrogen gas is used as representative of any reducing agent or any chemical/substance reacting with a rare earth oxide to form an elemental form of a rare earth from a corresponding rare earth oxide. Also, as described supra, the controller system 110 maintains the hydrogen gas at a concentration of less than four percent, such as greater than 0.1, 0.5, 1, or 2 percent and less than 4 or 3 percent.

Still referring to FIG. 5, the gas input system 400 is further described. Optionally and preferably unreacted hydrogen gas and the argon is recirculated, which reduces overall expense of production of the rare earth by reducing expense of the hydrogen gas reactant and by reusing the optionally and preferably unreactive carrier gas, in this case a noble gas and/or argon.

Monitoring System

Referring again to FIG. 1 and still referring to FIG. 5, several systems are available for monitoring reaction progress, such as the above described hydrogen sensor, residual gas analyzer, mass spectrometer, and/or UV/VIS/near-IR spectrometer. Any one or more of the monitoring systems is optionally and preferably replaced by one of several new monitoring systems described herein.

In a first case of the new monitoring system, mass of a collected solid product is monitored, where collection of the rare earth solid product is further described infra. As an increase in mass of the solid product decreases with time, the controller system 110 is programmed to recognize that the rare earth oxide reagent is running low, that the hydrogen gas concentration is too low, and/or the physical environment is not suitable for the reaction to proceed, such as the temperature being too low or the pressure too high, such as greater and 0.5, 1, 2, 5, or 10 torr.

In a second case of the new monitoring system, mass of the solid product is monitored and compared with mass of the corresponding elements of the provided unreacted rare earth oxide. As mass balance for the rare earth element is maintained, the mass, percentage, and/or quantity of the original rare earth oxide reactant is optionally determined by tracking mass of the collected corresponding rare earth. In a sub-case, when the feed system is used the mass of the collected rare earth is compared with the total mass of the rare earth constituent of the total rare earth oxide delivered to the reaction chamber. Masses are optionally and preferably reset upon starting a new batch or run of the rare earth extraction system 100.

In a third case of the new monitoring system, the gas product is monitored and compared with mass of the corresponding elements of the provided unreacted rare earth oxide. For example, mass of collected water is monitored after contaminant water is boiled off by reducing pressure in the reaction chamber 212. Mass of the water is measured using any chemical and/or physical process. In one example, a cold trap is used to freeze released water, which is further descried infra. Similar to the first and/or second case, mass of the frozen water is monitored with time to determine progress of the chemical reaction. For instance, mass/weight of the frozen water is measured with a scale and the total hydrogen and oxygen of the water is used to determine mass of the oxygen, which is $^{16}/_{18}{}^{th}$ of the total mass collected. The mass of the oxygen is compared with the total oxygen in the original unreacted rare earth oxide to determine the mass of remaining rare earth oxide in the reaction chamber 212 and/or a percentage of reaction completeness in the reaction chamber 212. Notably, as the frozen water is collected, mass of the reacted hydrogen is also optionally determined, which is $^{2}/_{18}{}^{th}$ of the total mass collected. Similarly, mass of collected hydrogen is used to track hydrogen concentration in the reaction chamber via mass balance. Generally, stoichiometry and at least one of equations 1 to 5 is used to determine mass of one element removed from the reaction chamber by measuring mass of another element removed from the reaction chamber.

Combined with input from any one or more of the reaction monitoring systems, the controller system 110 is optionally and preferably used to supply additional reagents, such as the rare earth oxide and/or hydrogen gas to the reaction chamber 212. For instance, if eighteen grams of water are collected, then the controller system knows from provided computer code and basic chemistry that two grams of hydrogen have been consumed in the reaction in the reaction chamber, such as via equation 2. Hence, the controller system 110 is programmed to inject hydrogen gas into the reaction chamber 212 from the hydrogen gas supply 414 until the 2 grams have been replaced. More generally, the controller system 110 is optionally and preferably programmed to drive the chemical reaction forward by replacing the consumed hydrogen gas as the hydrogen is collected as part of the collected water molecules. Notably, simply injecting enough hydrogen into the reaction chamber 212 to fully react with the rare earth oxide is not a safe option as this leads to explosive levels of hydrogen. In stark contrast, the solution of monitoring a reaction product, calculating hydrogen consumed, and replacing the consumed hydrogen allows for sub-explosive levels of hydrogen to be present in the reaction chamber 212 while still driving the rare earth oxide to rare earth reaction forward.

EXAMPLE II

In another example, the controller system 110 fills the reaction chamber 212 with a carrier gas, such as argon, from a carrier gas supply 412 using a first control valve 422 while simultaneously or optionally and preferably subsequently bringing the hydrogen gas concentration to a desired concentration using a hydrogen gas supply 414 and a second control valve 424. As the carrier gas is non-reactive, the controller system 110 replaces consumed hydrogen gas, as measured, by control of the hydrogen gas supply 414 as a function of time. Optionally, gas from the reaction chamber 212 is vented to atmosphere through use of a third control valve 426 and/or is recirculated through use of a fourth control valve 428, where one or more of the control valves are controlled by the controller system 110.

Cold Trap

Figure 6:
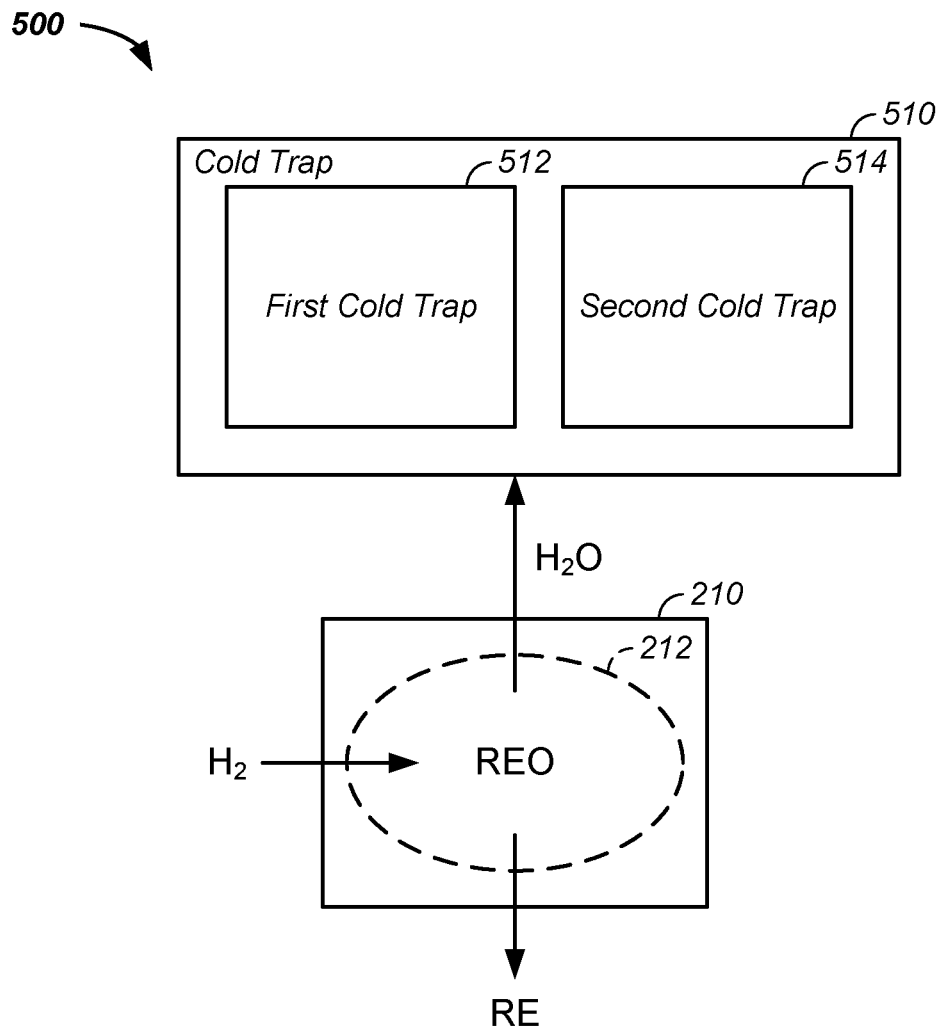
FIG. 6 illustrates use of a plurality of cold traps.

Referring now to FIG. 6, an optional cold trap system 510 of the gas output system 500 is further described. Generally, as the water product of any of equations 1 to 5 is generated, the water exits the reaction chamber 212, such as with the exiting and/or recirculating gas flow. In the cold trap system 510, the exiting/recirculating gas flows over, around, and/or through a condensing element. The condensing element is optionally a cooled coil, such as in use in a diffraction tower or still. However, a preferred condensing element, due to the plasma temperatures involved in the reaction chamber 212, is a dry ice chilled cold plate. As the water condenses and freezes on the chilled cold plate, the mass of the cold plate is monitored, such as with a balance, as described supra to monitor the reaction progress. Optionally and similarly, a capacitance between the cold plate and another non-condensing solid surface is used to monitor the reaction progress as the capacitance changes with increasing ice build-up. Notably, the water vapor is formed from atomic elements in the reaction chamber 212. The water vapor is formed from little water droplets that exist in the air, while steam is water heated to the point that it turns into gas. In simplified science, both are referred to as the gaseous state of water, where the gaseous state of the water condenses and freezes on the cold plate.

Still referring to FIG. 6, the cold trap 510 is further described. Optionally and preferably two cold traps are used, a first cold trap 512 and a second cold trap 514. The controller system 110 directs the escaping gas/vapor mix from the reaction chamber 212, such as through one or more redirection valves, toward the first cold trap 512 over a first period of time. Once the first cold trap has built up a layer of ice, the controller system 110 redirects the escaping gas/vapor mix from the reaction chamber 212 to the second cold trap 514, such as while the first cold trap 512 is being regenerated, such as by bringing above the freezing point of water. The cycle of switching repeats with one cold trap operating while the other regenerates, such as to allow for a semi-continuous/continuous operation of the reactor system 200.

Still referring to FIG. 6 and referring again to equations 1 to 5, as the cold trap pulls water out of the reaction chamber, equations 1 to 5 are driven forward according to Le Châtelier's principle, which states that if a dynamic equilibrium is disturbed by changing the conditions, the position of equilibrium shifts to counteract the change to reestablish an equilibrium.

EXAMPLE III

Rare Earth Extraction System

Figure 7:
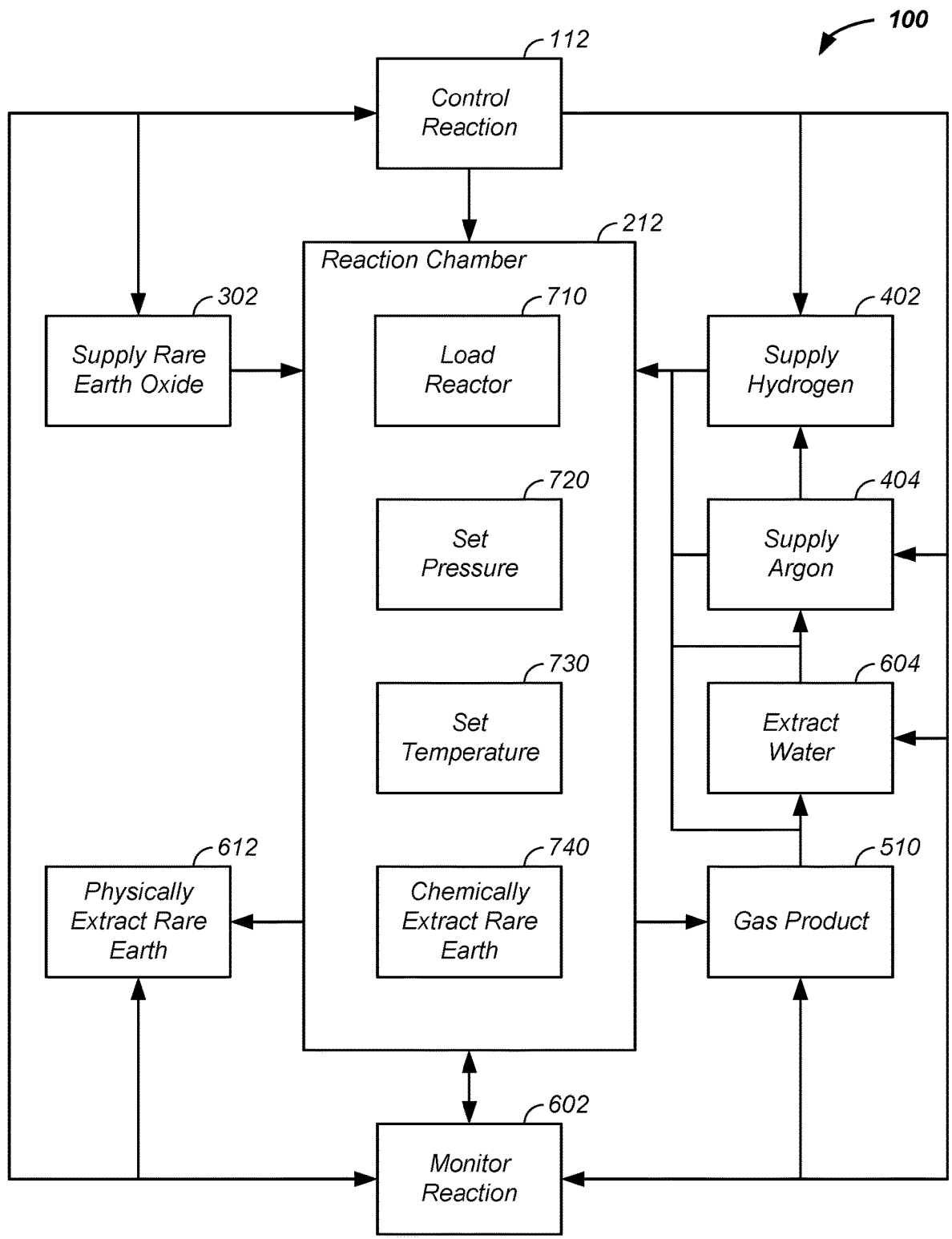
FIG. 7 illustrates use of a rare earth extraction system.

Referring now to FIG. 7, the rare earth extraction system 100 is further described in this example. In a first process, a rare earth oxide to rare earth reaction is controlled 112 using the controller system 110. In a second process, the controller system 110 directs loading the reactor 710, delivering the rare earth oxide 302 to the reaction chamber 212, supplying argon 404 and supplying hydrogen 402 to the reaction chamber, setting a pressure 720 in the reaction chamber 212 and/or, setting a temperature 730 in the reaction chamber 212. In a subsequent reaction process 740, the rare earth oxide reacts, such as in any of equations 1 to 5 or related equations, to form the rare earth. In a fourth process, gas products are formed 510 and released from the reaction chamber 212. In a fifth process, rare earths separate from the reaction mix 612, such as by an increase in density where the resultant rare earth product, a solid and/or a liquid form of the rare earth, drops to the bottom of the reaction chamber 212 and optionally falls through a low side release funnel, optionally valved, into a collection vessel/chamber outside of the reaction chamber 212. In a sixth process, reaction progress is monitored 602, as described supra, such as via a process of water extraction 604 and/or mass of the product. In a seventh process, the controller system 110 adds additional rare earth oxide and/or hydrogen to the reaction chamber 212. Optionally and preferably, the rare earth oxide is presented to the reaction chamber in a powder form with mean particle sizes of 1 to 250 microns, 10 to 100 microns, and/or 20 to 60 microns with a preferred size of 44 microns±10 microns, such as prepared by use of a standard 325 mesh screen.

In the reaction process 740, reactants are broken apart into component elements and/or elemental particles. For example, the particular rare earth oxide of neodymium oxide dissociates into Nd and/or an ion thereof and hydrogen dissociates into its ionic form, elemental form, and/or an ion thereof, such as $H_2^+$, $H^+$, $H^0$. The densities of these dissociated species have a buoyancy that maintains them in the reaction chamber soup, such as in a plasma suspension. Naturally, mixtures and combinations of the atomic and sub-atomic particles abound in the plasma matrix. However, as long as the upper limit of the plasma temperature is below that causing a dissociation of water, the reaction drives forward, especially with venting of the water vapor from the reaction chamber 212. Further, as the solid elemental form of the rare earth, in this case Nd(s) forms and falls out of the reaction chamber 212, the reaction drives forward. Thus, the controller system 110 optionally and preferably maintains the reaction chamber 212 at temperatures greater than 1000, 2000, 3000, or 4000° K and less than 4600, 4700, 4800, 4900, or 5000° K. The inventor notes that the ability to operate the reaction at lower temperatures, such as 2000±1000° K or 2000±500° K is through the use of one or both of atomic hydrogen and ionic hydrogen, $H^+$, which results in a more efficient reduction of the rare earth oxide, such as at a lower operating cost due to the reduced heating requirements.

Still yet another embodiment includes any combination and/or permutation of any of the elements described herein.

The main controller/controller/system controller, a localized communication apparatus, and/or a system for communication of information optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input device, such as a mouse, a keyboard, a display device, a voice recognition system, a motion recognition system, or the like. The processor is also communicatively coupled to an output device, such as a display screen or data link to display or send data and/or processed information, respectively. In one embodiment, the communication apparatus is the processor. In another embodiment, the communication apparatus is a set of instructions stored in memory that is carried out by the processor.

The client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, WA), Matlab® (MathWorks, Natick, MA), Java® (Oracle Corporation, Redwood City, CA), and JavaScript® (Oracle Corporation, Redwood City, CA).

The main controller/controller/system controller comprises computer implemented code to control one or more sub-systems. The computer implemented code is programmed in any language by one skilled in the art of the subsystem and/or by a skilled computer programmer appropriate to the task. Herein, for clarity of presentation and without loss of generality, specific computer code is not presented, whereas computer code appropriate to the task is readily available commercially and/or is readily coded by a computer programmer with skills appropriate to the task when provided the invention as described herein.

Herein, any number, such as 1, 2, 3, 4, 5, is optionally more than the number, less than the number, or within 1, 2, 5, 10, 20, or 50 percent of the number.

Herein, an element and/or object is optionally manually and/or mechanically moved, such as along a guiding element, with a motor, and/or under control of the main controller.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for generating a rare earth from a rare earth oxide, comprising the steps of:
dissociating the rare earth oxide and hydrogen gas in a reaction chamber by inductively heating the reaction chamber to greater than 2000 K to form the rare earth and water vapor in a reaction process;

driving the reaction process forward by removing the water vapor from the reaction chamber by condensing and freezing the water vapor on a first cold trap surface as water ice, according to Le Chatelier's principle;

prior to said step of dissociating, placing the rare earth oxide as a powder into said reaction chamber and cooling said reaction chamber to lower than −25° C.; and after said step of placing and prior to said step of dissociating, reducing pressure of said reaction chamber to less than 0.05 torr, wherein a water impurity of said rare earth oxide boils off as less than 1 torr at a molecular velocity leaving greater than ninety percent of said rare earth oxide in said reaction chamber.

2. The method of claim 1, said reaction process comprising:

$$RE_2O_3 + 3H_2 \rightarrow 2RE + 3H_2O$$

where REO is a rare earth oxide and RE comprises a rare earth in the rare earth oxide, where the rare earth comprises at least one of: cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

3. The method of claim 1, further comprising the steps of:
weighing the cold trap to determine mass of water ice by difference;
calculating mass of hydrogen in the water ice; and
a controller system, provided said mass of hydrogen, injecting hydrogen gas into said reaction chamber to replace a portion of said mass of hydrogen while maintaining hydrogen concentration in said reaction chamber at less than four percent hydrogen gas by volume.

4. The method of claim 3, further comprising the steps of:
calculating a reduced mass of the rare earth oxide in said reaction chamber using stoichiometry and the mass of hydrogen;
said controller system using a solid feed system to mechanically deliver additional rare earth oxide to said reaction chamber to replace at least a portion of the reduced mass of the rare earth oxide.

5. The method of claim 1, further comprising the step of:
collecting the rare earth product in at least one of a liquid form and a solid form after settling to the bottom of the reaction chamber as a result of a density difference of the rare earth product from the rare earth oxide dissociation particles in a plasma in the reaction chamber.

6. The method of claim 5, further comprising the step of:
weighing said collected rare earth product to determine a product mass of said rare earth.

7. The method of claim 6, further comprising the step of:
a controller system, using said product mass of said rare earth and stoichiometry, mechanically delivering additional rare earth oxide to said reaction chamber to replace at least a portion of said rare earth oxide calculated as being converted to said rare earth product.

8. The method of claim 6, further comprising the steps of:
a controller system, using said product mass of said rare earth and stoichiometry to calculate a mass of hydrogen gas consumed in the reaction process; and
said controller system injecting additional hydrogen gas into said reaction chamber to replace at least a portion of the mass of hydrogen gas consumed in the reaction process while maintaining a hydrogen gas concentration of less than four percent by volume in said reaction chamber.

9. The method of claim 1, further comprising the step of:
a controller system redirecting the water vapor from said first cold trap to a second cold trap through control of an exit valve; and
regenerating said first cold trap while said second cold trap said step of drives the reaction process forward by condensing and freezing the water vapor.

* * * * *